United States Patent [19]

Bernal

[11] 4,447,457
[45] * May 8, 1984

[54] READILY PORTABLE FOOD ITEM

[75] Inventor: Eddie L. Bernal, Defiance, Ohio

[73] Assignee: Taco Operations, Inc., Defiance, Ohio

[ * ] Notice: The portion of the term of this patent subsequent to Aug. 16, 2000 has been disclaimed.

[21] Appl. No.: 498,148

[22] Filed: May 25, 1983

Related U.S. Application Data

[60] Continuation-in-part of Ser. No. 389,705, Jun. 18, 1982, which is a division of Ser. No. 342,380, Jan. 25, 1982, Pat. No. 4,399,156.

[51] Int. Cl.³ .................. A21D 13/00; A23L 1/00
[52] U.S. Cl. .................................. 426/91; 426/92; 426/94; 426/134; 426/138; 426/297; 426/421; 426/439
[58] Field of Search .................. 426/91, 92, 94, 134, 426/297, 138, 391, 283, 421, 110, 523, 439, 440; 99/450.1, 450.6

[56] References Cited

U.S. PATENT DOCUMENTS

| | | | |
|---|---|---|---|
| 1,778,485 | 10/1930 | Davidson | 426/134 |
| 2,060,490 | 11/1936 | Borbely | 426/94 |
| 2,589,823 | 3/1952 | Krens | 426/91 |
| 3,143,424 | 8/1964 | Wilson | 426/94 |
| 3,410,691 | 11/1968 | Stanley | 426/94 |
| 3,615,678 | 10/1971 | Tangel et al. | 426/297 |
| 3,656,968 | 4/1972 | Allen | 426/283 |
| 3,669,007 | 6/1972 | Pulici | 99/450.6 |
| 3,782,966 | 1/1974 | Forkner | 426/94 |
| 3,804,956 | 4/1974 | Bongiovanni | 426/134 |
| 3,904,772 | 9/1975 | Moegle | 426/92 |
| 4,084,493 | 4/1978 | Quintana | 99/450.6 |
| 4,139,644 | 2/1979 | Stephenson | 426/523 |
| 4,144,356 | 3/1979 | McDaniel | 426/91 |

FOREIGN PATENT DOCUMENTS

| | | | |
|---|---|---|---|
| 508065 | 12/1954 | Canada | 426/138 |
| 2383608 | 11/1978 | France | 426/94 |
| 786217 | 11/1957 | United Kingdom | 426/91 |

OTHER PUBLICATIONS

Time–Life Foods of the World, Cooking of China Hahn 1968.
A Guide to the Selection, Combination & Cooking of Foods, vol. 2, Rietz et al., Avi Publ. 1965.

Primary Examiner—Steven L. Weinstein
Attorney, Agent, or Firm—Allen D. Gutchess, Jr.

[57] ABSTRACT

A highly portable food item is provided and more specifically a burrito-type product on a stick. A burrito consists essentially of a highly pliable, soft tortilla wrapped around a burrito food filler. The new burrito-type product includes a self-sustaining tortilla with an edge portion thereof wrapped around a stick or other suitable elongate member which is held by the customer. The food filler is circumferentially enclosed within the remaining portion of the tortilla, with the upper end of the tortilla first turned in to enclose the upper end and with the lower end of the tortilla subsequently tucked in to enclose that end. The portability of the food item thus approaches that of an ice cream bar or coated hot dog having a stick impaled in one end thereof, for example.

20 Claims, 9 Drawing Figures

U.S. Patent  May 8, 1984  4,447,457
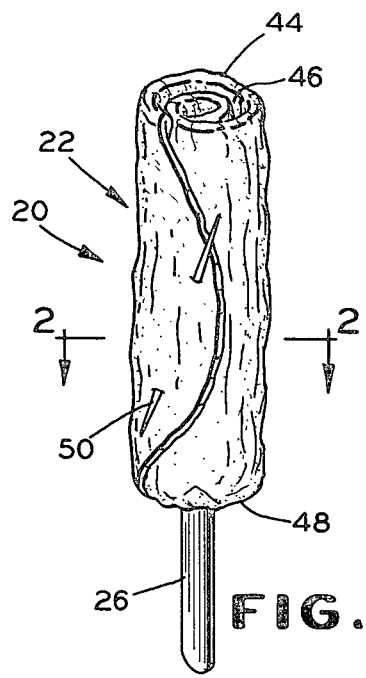
FIG. 1
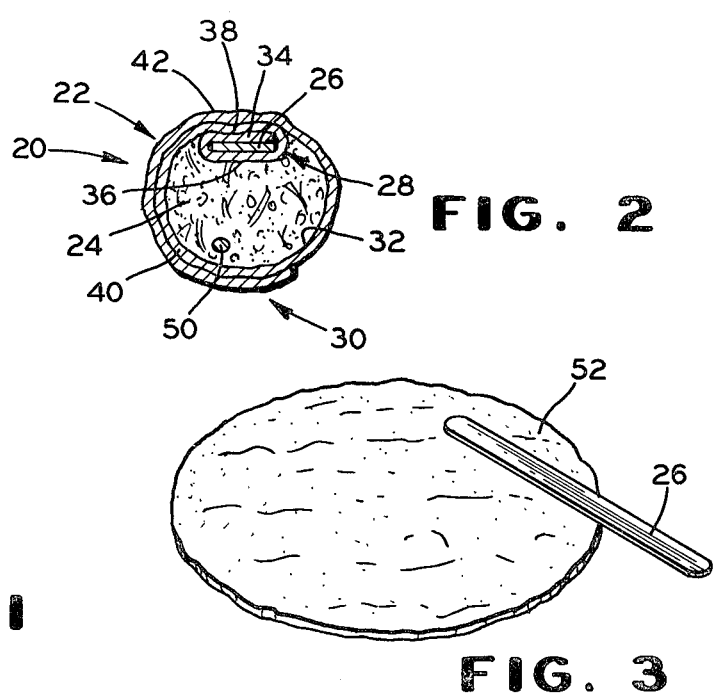
FIG. 2
FIG. 3
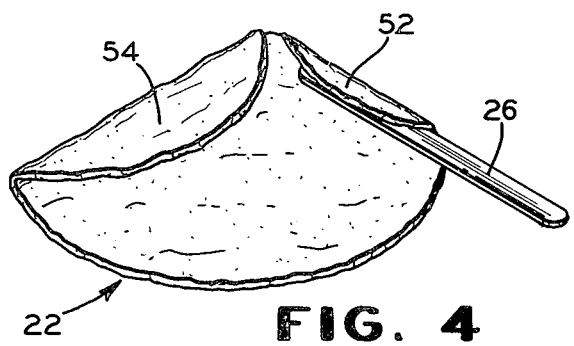
FIG. 4
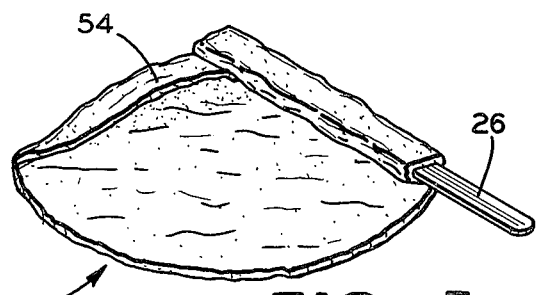
FIG. 5
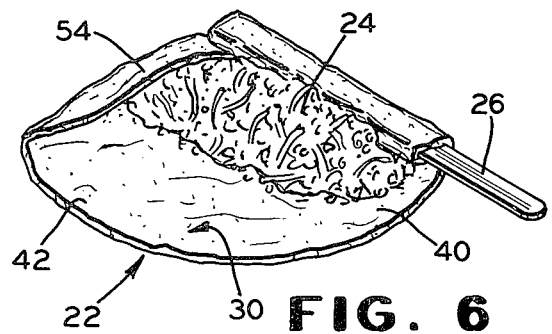
FIG. 6
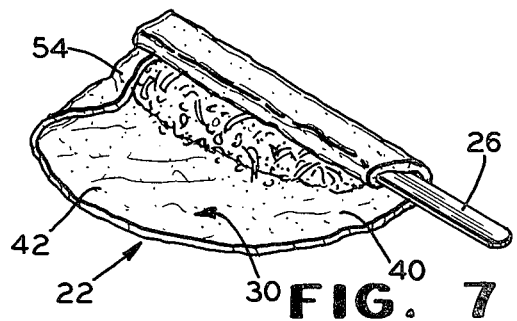
FIG. 7
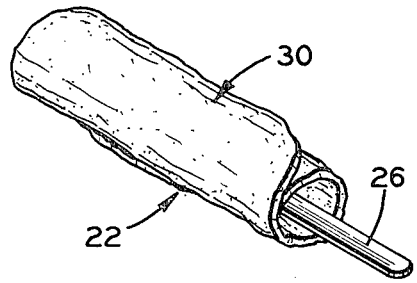
FIG. 8
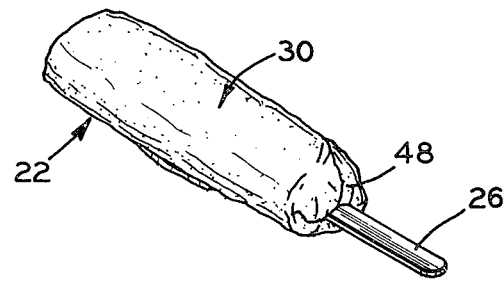
FIG. 9

READILY PORTABLE FOOD ITEM

This application is a continuation-in-part of my U.S. application Ser. No. 389,705, filed June 18, 1982, which is a division of my U.S. application Ser. No. 342,380, filed Jan. 25, 1982 now U.S. Pat. No. 4,399,156.

This invention relates to a portable food item and more particularly to a portable Mexican-type food item including a burrito product mounted on an elongate member.

With increased popularity in Mexican food, burritos have kept an equal, if not a faster, pace. Burritos are made of a soft, highly pliable tortilla in a generally cylindrical shape which is wrapped around a burrito food filler. The filler usually includes seasoned meat or beans but, more recently, other food fillers have also been used, including such items as fruit. With the tortilla being soft and pliable, and the filler being squishy, if not juicy, of practical necessity, the burrito must be eaten on a plate. Consequently, burritos are usually sold by restaurants with dine-in facilities or purchases only by customers taking them home to eat.

The present invention provides a highly portable food item and specifically a burrito product which can be carried about and eaten as easily as an ice cream bar or a coated hot dog impaled on a stick, by way of example.

The portable food item includes an edible sheet, more specifically a tortilla, enclosing a food filler with an elongate member or stick extending from one end thereof to be grasped by the consumer during consumption of the product. The tortilla is wrapped around a portion of the stick and an upper edge of the tortilla beyond the end of the member or stick is turned down to form a flap. The remainder of the tortilla is positioned around a food filler and on the wrapped portion to form a chamber circumferentially enclosing the food filler with the inner flap enclosing the upper end of the food filler. The tortilla is rendered in a semi-rigid, self-sustaining state by cooking so as to maintain a stiff, upright position with the aid of the wrapped portion of the stick when the exposed part of the stick is hand held. The tortilla is affixed to the stick with about half the length of the stick projecting from an edge of the tortilla and with about half enclosed in the wrapped portion of the tortilla.

In making the portable food item, specifically a Mexican-type food item in the form of a burrito-type product, a soft, pliable tortilla, which is commonly made with white flour or cornmeal, is provided, usually in a generally circular shape. The tortilla is laid flat on a suitable supporting surface and the elongate member or stick is spaced near an edge of the tortilla with about half the stick juxtapositioned thereon. The upper edge of the tortilla beyond the end of the stick is turned downwardly approximately one-fourth the diameter of the tortilla to form a flap. The portion of the tortilla between the near edge and the stick is folded over the stick, and the stick and contiguous portion of the tortilla are turned 180° to wrap the tortilla completely around the stick. The turning step can be repeated, if desired, to provide at least two layers of the tortilla on each side of the stick. A food filler is then placed on the inner part of the remaining flat portion of the tortilla adjacent the wrapped portion of the stick and is also tucked under the flap. The wrapped portion is then turned over the food filler and the outer part of the remaining flat portion beyond the food filler so that the remaining portion of the tortilla circumferentially encloses the food filler and is in overlapping contact with the wrapped portion of the tortilla, with the flap enclosing the food filler at the upper end. The lower end of the tortilla adjacent the stick is tucked in to enclose that end.

The outer part of the flat portion of the tortilla is then fastened to the overlapped portion by suitable means, such as a toothpick, to hold the tortilla firmly together. The resulting uncooked product is then placed in hot liquid and cooked, the hot liquid preferably being oil in which the uncooked product is immersed. It remains in the oil until it floats to the surface, indicating that it is done. The tortilla at this time has attained a self-sustaining state and it will remain substantially rigid even when held in an upright position by the exposed portion of the stick. The stick aids in supporting the tortilla, and the flap, forming a double wall with the adjacent upper portion of the tortilla, also aids in supporting the upper portion of the tortilla beyond the inner end of the stick, as well as serving to close off the upper end of the product. The fastener or toothpick can be removed and the product is ready for sale and consumption.

It is, therefore, a principal object of the invention to provide a highly portable food item and a method for making same.

Another object of the invention is to provide a portable food item comprising an edible sheet which is partially wrapped around an elongate supporting member and also circumferentially encloses a food filler, with an upper portion of the edible sheet forming an inwardly-extending flap enclosing the upper end of the food filler.

A further object of the invention is to provide a burrito-type food product and a method of making same, which product can be carried about and eaten without the aid of a plate or other supporting surface.

Many other objects and advantages of the invention will be apparent from the following detailed description of a preferred embodiment thereof, reference being made to the accompanying drawings, in which:

FIG. 1 is a view in perspective of a portable food item in accordance with the invention;

FIG. 2 is a view in transverse cross section taken along the line 2—2 of FIG. 1; and FIGS. 3–9 are somewhat schematic views in perspective showing the steps for making the portable food item in accordance with the invention.

Referring to the drawings, and particularly to FIGS. 1 and 2, a highly portable food item in accordance with the invention is indicated at 20. The food item is discussed subsequently as being in the form of a Mexican-type food, specifically a burrito. However, the portable food item can also take other forms, such as being a pancake wrapped around sausage, or crepes wrapped around a suitable food filler, by way of example. The burrito includes an edible sheet, specifically a tortilla 22 with a food filler 24 and an elongate supporting and carrying member or stick 26 projecting downwardly. The tortilla 22 has a closely wrapped portion 28 around the stick 26 and an outer, major remaining portion 30 positioned around the food filler 24 and in overlapping relationship with the wrapped portion 28, forming a generally cylindrical chamber 32.

The closely wrapped portion 28 of the tortilla 22 includes at least one layer 34 on one side of the stick 26 and at least one layer 36 on the other side of the stick so that the stick is entirely wrapped with a portion of the tortilla. In this instance, at least one additional layer 38 extends around the stick with the layers being supported by the enclosed portion of the stick 26, which constitutes about half its length. The layers also form a structural core extending somewhat beyond the end of the stick to the edge of the product. This enables the burrito to be eaten more easily than if the stick were to extend completely to the end of the burrito.

The outer portion 30 of the tortilla includes an inner part or layer 40 extending from the layer 38 around the food filler 24 to the wrapped portion 28. An outer part or layer 42 of the outer portion 30 extends over and beyond the wrapped portion 28 in overlapping relationship. The food filler 24 is thereby circumferentially enclosed. An upper end 44 of the tortilla 22 has an inwardly and downwardly-extending flap 46 which serves to enclose the upper end of the food filler. A lower end 48 of the tortilla is turned or tucked in, as shown in FIG. 9, to enclose the lower end of the food filler. The food filler 24 is thus completely enclosed by portions of the tortilla 22 when the burrito product is being cooked and before it is eaten.

A temporary fastener 50, which can be in the form of a toothpick or the like, holds the tortilla 22 temporarily together until after it is cooked and achieves a self-sustaining state. The fastener 50 preferably extends through the layer 42, through the layer 40, into the food filler 24, and out again, also being on a diagonal to hold longitudinally-spaced portions of the layers in place.

In producing the food item, the generally circular edible sheet or tortilla 22 is laid on a suitable flat surface and the elongate member or stick 26 is positioned thereon, as shown in FIG. 3. The stick is placed in a chordal position with about half of its length overlaying the tortilla and about half projecting beyond the peripheral edge thereof. The length of the stick on the tortilla is sufficient to support a substantial portion of the length of the final product while the length of the stick extending beyond the tortilla is sufficient to be readily grasped by the hand of the consumer. The stick is much closer to one edge portion of the tortilla than the opposite edge portion with a maximum distance of the stick from the nearer edge in a radial direction being about one-fourth the diameter of the tortilla. An edge portion 52 of the tortilla at the side of the stick 26 is turned over the upper surface of the stick (FIG. 4), the stick being non-circular, and preferably rectangular in transverse cross section. This forms the first layer 34 on the stick.

An upper edge portion 54 of the tortilla beyond the inner end of the stick 26 also is turned or folded down to form the flap 46 of the final product. The fold line is perpendicular to the stick to form the squared upper end 44 on the final product 20. The portion 54 preferably has a maximum width of from about one-fifth to about one-third the diameter of the tortilla 22.

The stick 26 is then turned 180° in a counterclockwise direction as viewed in FIG. 5 to form the layers 36 and 38 (FIG. 2) on opposite sides of the stick 26 to assure that the stick is completely wrapped with the tortilla so as to be securely affixed thereto after cooking.

Referring to FIG. 6, the food filler 24 is then placed on the inner part 40 of the remaining portion 30 of the tortilla with the food filler also being pushed under the flap 54 which is raised by the food preparer, as also shown in FIG. 5.

Referring to FIGS. 7 and 8, the wrapped portion 28 of the tortilla and the stick are moved over the food filler so that the inner part 40 of the remaining portion 30 circumferentially enclose the filler 24. Further movement of the wrapped portion positions the outer part or layer 42 of the remaining portion 30 in overlapping relationship with the wrapped portion 28 and with the part or layer 40. The overlapping relationship of the layers also provides greater structural integrity for the outer walls of the food filler chamber 32.

The flap 54 encloses the food filler as the remaining portion 30 of the tortilla reaches its enclosing and overlapping position to close off the upper end of the burrito without further steps being required. The flap also forms a double wall with the portion of the tortilla extending beyond the inner end of the stick 26 to provide greater structural integrity for that unsupported portion of the burrito.

The lower end of the tortilla is then tucked or turned in (FIG. 9) to close off the lower end of the food filler. The temporary fastener 50 is then inserted through the product as described earlier.

At this point, the tortilla 22 still retains its highly pliable, soft state and would simply fall apart if one attempted to lift it by the exposed portion of the stick 26. However, the product is then cooked or heated in a manner to cause the tortilla or other edible sheet 22 to obtain a semi-rigid, self-sustaining state. In that state, the tortilla is not as crisp as a cooked taco shell, for example, but is in an intermediate state of hardness between a cooked taco shell and the original soft, pliable tortilla. It can be described as having a hardness similar to that of a crescent roll, for want of a better definition.

A preferred method of achieving this state of the tortilla is by immersing the assembled food item in hot liquid. A suitable container of hot cooking oil at a temperature of 325°–375° F. can be employed. The assembled item is immersed in the oil where it is allowed to remain until it rises to the surface, which indicates that it is done. During the cooking process, the tortilla swells slightly so that the wrapped portion 28 around the stick 26 more fully engages and adheres to the stick. The item is then ready for sale and consumption with the fastener 50 being removed first, if desired. The product can then be eaten from the upper end 44 down and the consumer can carry it about while doing so.

Various modifications of the above-described embodiment of the invention will be apparent to those skilled in the art and it is to be understood that such modifications can be made without departing from the scope of the invention, if they are within the spirit and the tenor of the accompanying claims.

I claim:

1. A portable food item comprising an edible sheet in a self-sustaining state, a substantially rigid and self-supporting elongate member capable of being hand held and supporting the edible sheet, said elongate member having a substantial portion of its length projecting beyond an edge of said sheet with the remaining portion of the member having an edge portion of the sheet affixed thereto by being wrapped completely therearound from said edge portion of said sheet toward an opposite edge portion thereof, with the remaining portion of the edible sheet, which is a major portion of the sheet, forming a chamber contiguous with the wrapped portion, a food filler contained within said chamber, said sheet having one edge portion between the aforesaid edge portions at an end of said chamber turned over the food filler and extending into the chamber to enclose an end of said chamber, said sheet having another edge portion at the other end of said chamber closed off to enclose the other end of said chamber, said sheet being at least partially cooked and in a semi-rigid, self-sustaining state.

2. A portable food product according to claim 1 characterized by said sheet having a state of hardness between a cooked taco shell and an uncooked soft, pliable tortilla.

3. A portable food item according to claim 1 characterized by said sheet having a hardness similar to that of a crescent roll.

4. A food item according to claim 1 wherein said elongate member is of non-circular shape in transverse cross section.

5. A portable food item according to claim 1 characterized by said sheet being swollen slightly in its cooked state from its original state so that the wrapped portion thereof tightly engages said elongate member.

6. A food item according to claim 1 wherein the portion of the sheet which is wrapped around the elongate member forms at least two layers on one side of the elongate member.

7. A portable food item according to claim 6 characterized by said layers of said sheet on opposite sides of the elongate member extending beyond the end of the elongate member to an edge of the sheet.

8. A food item according to claim 1 characterized by said remaining portion of the sheet forming the chamber being in substantially overlapped relationship.

9. A portable food item according to claim 1 characterized by said edible sheet being a tortilla.

10. A portable Mexican-type food item comprising an at least partially cooked tortilla in a semi-rigid, self-sustaining state, a substantially rigid and self-supporting elongate member capable of being hand held and supporting the tortilla, said elongate member being non-circular in transverse cross section, said elongate member having a substantial portion of its length projecting beyond an edge of the tortilla with the remaining portion of the elongate member having an edge portion of the tortilla affixed thereto by being wrapped therearound from the one edge portion toward an opposite edge portion, the remaining portion of said tortilla, which is a major portion thereof, forming a chamber contiguous with the wrapped portion with said opposite edge portion of said tortilla being in overlapped relationship with the portion of the tortilla adjacent the wrapped portion, the wrapped portion of the tortilla extending beyond the wrapped end of said elongate member, an edge portion of said tortilla between the aforesaid edge portions and beyond the wrapped end of the elongate member being turned inwardly to form a flap enclosing an end of said chamber, said remaining portion of said tortilla having an edge portion at the other end of said chamber extending inwardly to close off that end of the chamber, and a food filler located within said chamber and partly under said flap.

11. A portable Mexican-type food item according to claim 10 wherein the wrapped portion of the tortilla is slightly swelled in its cooked state from the original state to cause said wrapped portion to be tightly adhered to said elongate member.

12. A food item according to claim 10 wherein said elongate member is of non-circular shape in transverse cross section.

13. A food item according to claim 10 characterized by said tortilla being of generally circular shape, when flat.

14. A method of making a portable food item comprising providing a soft, edible sheet of predetermined shape, laying the edible sheet on a surface, positioning an elongate member on the sheet with a substantial portion of its length projecting beyond an edge of the sheet a sufficient distance to be hand held and located asymmetrically on the sheet with a large portion of the sheet on one side of the elongate member and a smaller portion of the sheet on the opposite side of the elongate member, said elongate member further being positioned with an edge portion of the large portion of the sheet extending beyond an end of the elongate member on the sheet, turning back the edge portion of the large portion of the sheet which is beyond the end of the member, wrapping the smaller portion of the sheet and part of the large portion around the elongate member, placing a food filler on an inner part of the remaining portion of the large portion of the sheet which is adjacent the wrapped elongate member and under the turned back edge portion, positioning the remaining portion of the large portion around the food filler and with an outer part of the remaining portion of the large portion in overlapping relationship with the wrapped portion to circumferentially enclose the food filler, and immersing the sheet and filler in hot liquid to cause the wrapped portion of the sheet to swell and become secured more fully to the elongate member and to render the sheet in a substantially self-sustaining state.

15. A method according to claim 14 characterized by tucking in edge portions of the sheet adjacent the projecting elongate member to enclose the food filler at an end thereof opposite the turned back edge portion.

16. A method according to claim 14 characterized by fastening together overlapped portions of the sheet prior to immersing the sheet and the filler in the hot liquid.

17. A method of making a portable food item according to claim 14 characterized further by positioning said elongate member on the edible sheet such that the wrapped portion thereof extends beyond the inner end of the elongate member.

18. A method according to claim 14 characterized by heating said hot liquid to a temperature of 325°–375° F. prior to immersing the sheet and filler therein.

19. A method according to claim 14 characterized by cooking the sheet and filler in the liquid until the sheet and filler rise to the surface of the liquid, and removing the sheet and filler from the liquid.

20. A method according to claim 14 characterized by providing the soft edible sheet in the form of a tortilla of generally circular shape.

* * * * *